United States Patent [19]
Hamilton
[11] Patent Number: 4,959,910
[45] Date of Patent: Oct. 2, 1990

[54] PRINTING PRESS

[76] Inventor: Tommy R. Hamilton, 9712 Carnegie, Dallas, Tex. 75228

[21] Appl. No.: 465,901
[22] Filed: Jan. 16, 1990
[51] Int. Cl.5 .......... G01D 21/00
[52] U.S. Cl. .......... 33/623
[58] Field of Search .......... 33/613-623; 101/DIG. 36, 474, 297, 298

[56] References Cited

U.S. PATENT DOCUMENTS 2,535,725 12/1950 Curtis .
2,907,274 10/1959 Taylor .
3,616,055 10/1971 Mages .
4,383,760 5/1983 Deter et al. .

*Primary Examiner*—Harry N. Haroian
*Attorney, Agent, or Firm*—Hubbard, Thurman, Turner, Tucker & Harris

[57] ABSTRACT

A printing press is provided having an improved register cam incorporated therein, the printing press also including a transverse alignment mechanism for aligning the printing medium prior to printing thereon. The improved register cam includes adjustment means associated therewith for selectively adjusting the linear position of the alignment member responsible for engaging and the aligning the printing medium.

10 Claims, 3 Drawing Sheets

PRINTING PRESS

FIELD OF THE INVENTION

This invention relates generally to improved printing presses and, more particularly, to printing presses incorporating improved register cams having linear adjustment mechanisms associated therewith.

DESCRIPTION OF THE PRIOR ART

The conventional printing press has remained virtually unchanged during the 20th Century, so that many machines currently in use today are practically identical to those used 100 years or more ago. The modern automatic platen press performs the same basic mechanical functions as did platen presses used in the early 1800's. Platen presses typically function as follows: initially, the characters or image to be printed are set in a form which is secured to a bed; ink is then applied to the raised surface of the characters, and a piece of paper (or other printing medium) is positioned on the platen; finally, the printing medium is carefully aligned with the characters on the form, and the platen is pressed against the form. It is the third step, wherein the printing medium is carefully aligned with the form, to which the present invention relates.

A typical example of a modern printing press which incorporates early 19th Century technology is the Kluge Automatic Platen Press manufactured by Brandtjen and Kluge of St. Paul, Minn. In this press, transverse location of the printing medium is accomplished by a cam-operated register mechanism utilizing a side register gauge to push the printing medium to its proper position. The side register gauge is the main component of the register gauge assembly, which is mounted on a register rod by means of an eye bolt and corresponding retaining nut. Gross adjustment of the lateral, or transverse, movement of the side register gauge is typically accomplished by loosening the retaining nut to mobilize the register gauge assembly, and moving the assembly to the left or right as needed. Once the proper general position has been determined for the side register gauge, the retaining nut is re-tightened. Fine adjustment is then performed b turning an adjustment nut which forces the register gauge to pivot left or right, depending on the direction the adjustment nut is turned. This adjustment procedure is typically both time consuming and imprecise, and must be repeated frequently due to inadvertent loosening of the adjustment nut caused by vibration of the printing press.

In order to avoid the aforementioned loosening of the adjustment nut by vibration, it has become common in the industry to weld or otherwise permanently fix the adjustment nut in a convenient, pre-selected position. Once the adjustment nut is so fixed, both fine and gross adjustment of the register gauge must be performed by loosening the retaining nut and sliding the register gauge assembly along the register rod as necessary. This method of lateral adjustment is highly imprecise and makes fine adjustment even more difficult and time consuming than before.

SUMMARY OF THE PRESENT INVENTION

An object of the present invention is to provide an improved register cam having an adjustment mechanism associated therewith. The adjustment mechanism allows for quick and precise fine adjustment of the side register gauge, without involving either the gauge assembly retaining nut or the adjustment nut. A further object of this invention is to provide a register cam having an adjustment mechanism incorporated therein which is virtually unaffected by the vibrations caused by normal operation of the printing press.

Another object of this invention is to provide an improved printing press incorporating a transverse adjustment mechanism in accordance with the principles disclosed herein.

In accordance with the teachings of the present invention, there is disclosed herein a printing press having an improved register cam mounted thereon, the register cam having a transverse adjustment mechanism incorporated therein. As with conventional devices, the printing press disclosed herein includes a register gauge assembly and cooperating components making up an alignment mechanism for transversely aligning the printing medium prior to printing thereon. The improved register cam has an enlarged body portion through which a threaded rod extends. A slidable receptacle is disposed within the body portion, and includes a threaded bore for engaging the threaded rod. A knob fixed to one end of the threaded rod allows the rod to be easily rotated by hand, thus producing linear movement of the receptacle. A portion of the transverse alignment mechanism is secured to the receptacle, whereby, precise adjustment of the alignment mechanism is possible by rotating the knob as required.

These and other objects of the present invention will become apparent from the reading of the following specification, taken in conjunction with the enclosed drawings.

DETAILED DESCRIPTION OF THE PREFERRED EMBODIMENT

Figure 4:
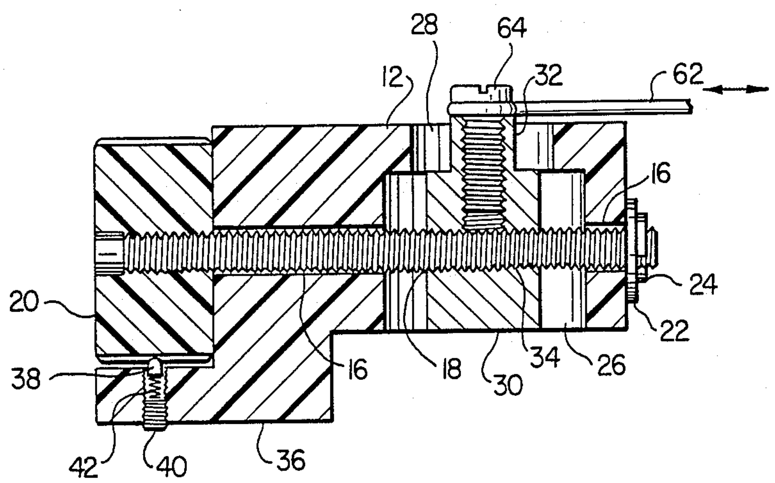
FIG. 4 is a cross-sectional view of the present invention taken along line 4—4 of FIG. 3.
Figure 5A:
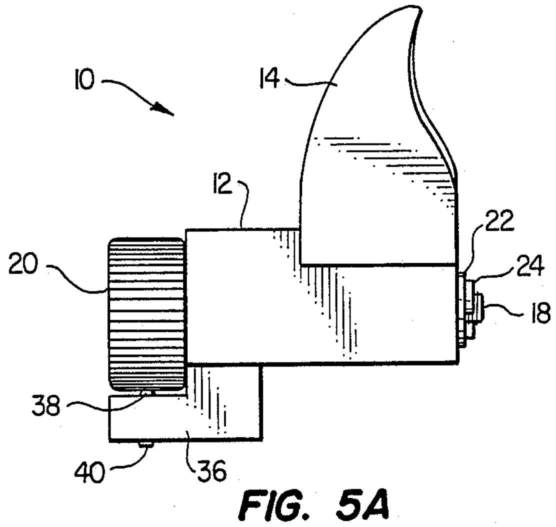
FIG. 5A is a side elevational view of the preferred embodiment of the present invention, with the cam member adapted for gear side registering.
Figure 6:
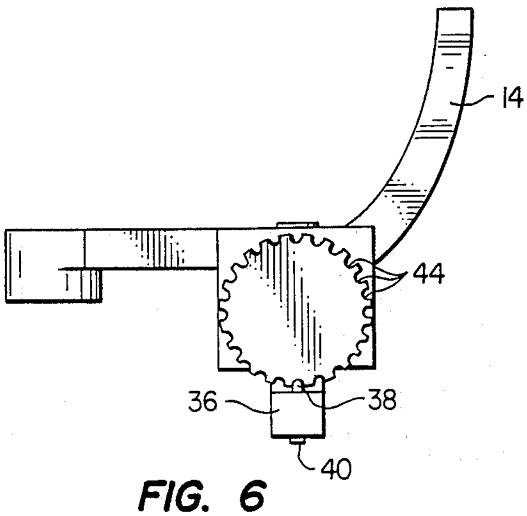
FIG. 6 is an end elevational view of the preferred embodiment of the present invention.
Figure 5B:
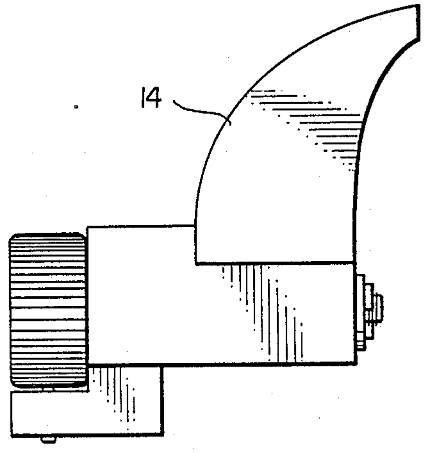
FIG. 5B is a side elevational view of the preferred embodiment of the present invention, with the cam member adapted for operator side registering.

Before the features of the present invention are described in detail, it should be noted that there are two preferred embodiments of the present invention, the first being illustrated in FIG. 5A and the second being illustrated in FIG. 5B. Those skilled in the art will immediately recognize that the transverse alignment of the printing medium is accomplished by either a "gear side" register or an "operator side" register, with neither being especially preferably over the other; the choice is typically dictated by the job, not by preference. For the sake of convenience, the description set forth below focuses on the operation of a gear side register cam incorporating the principles of this invention, as shown in FIGS. 2A, 2B, 3, and 5A. From this disclosure, those skilled in the art will readily understand that the principles of this invention are equally applicable to an operator side register cam, as shown in FIG. 5B. Finally, the internal workings of the preferred embodiment shown in FIG. 4 and the end view shown in FIG. 6 are the same for either the gear side or operator side register cam incorporating the unique adjustment features taught by this invention.

Figure 1:
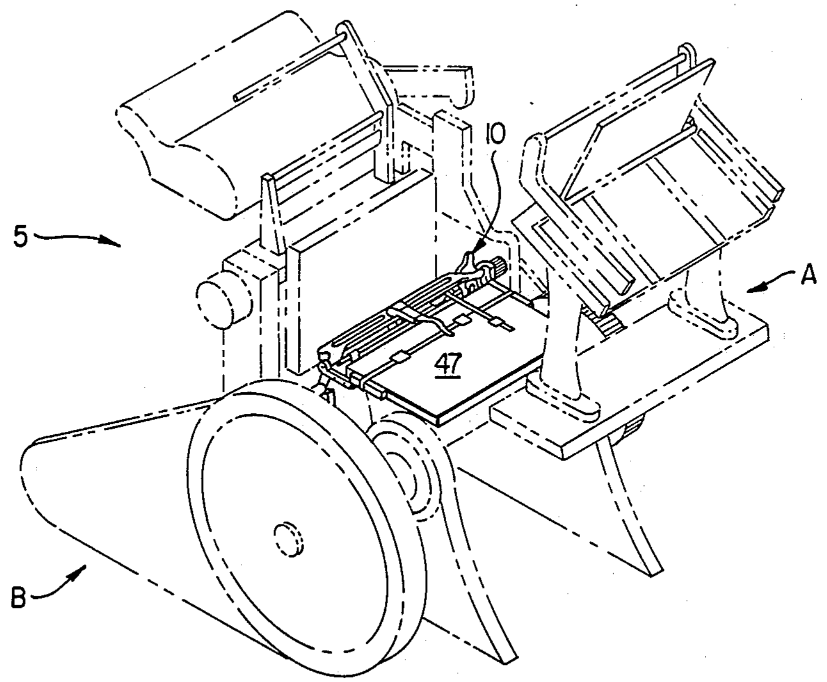
FIG. 1 is a perspective view of a printing press incorporating the principles of the present invention, with conventional components not affected by this invention shown in phantom.

Referring now to FIG. 1, an improved printing press is designated generally by the numeral 5, the improvement consisting of the inclusion of improved register cam 10 as a component in the otherwise conventional printing press. Identifying letter "A" designates the gear side of printing press 5, while letter "B" designates the operator side.

Figure 3:
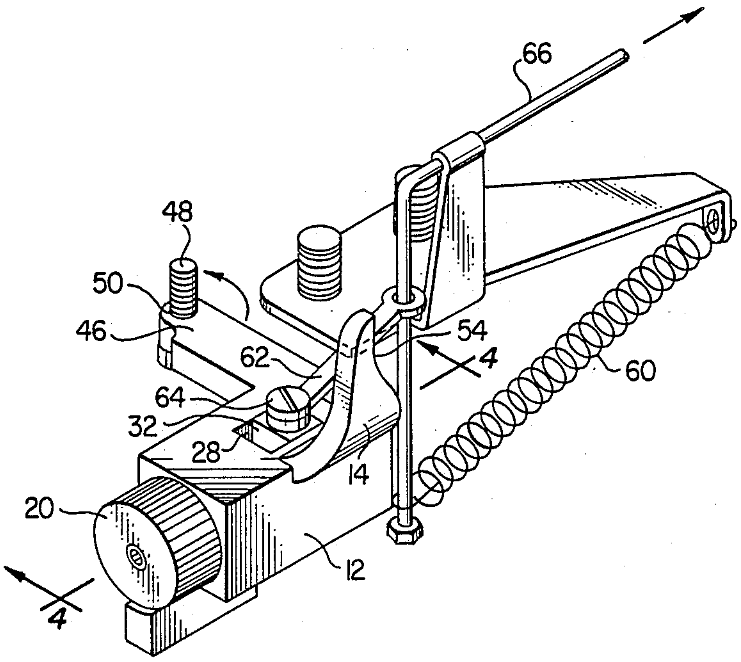
FIG. 3 is a perspective view of the improved register cam of the present invention, showing in greater detail the relationship between the register cam and the document alignment mechanism.

Referring now to FIGS. 3 and 4, register cam 10 comprises a body 12 with camming member 14 extending therefrom. Bore 16 extends longitudinally through body 12, and includes threaded member 18 disposed therein. Threaded member 18 is longitudinally retained by means of knob 20, which serves as a gripping surface for rotating threaded member 18, with washer 22 and retaining ring 24 securing the opposite end of threaded member 18.

The body 12 of register cam 10 also includes a cavity 26 with open slot 28 extending through the top surface of body 12. Slidably disposed within cavity 26 is receptacle 30 with upper threaded portion 32 extending through slot 28. Receptacle 30 also includes a horizontal threaded bore 34, which is adapted to engage threaded member 18 as indicated in FIG. 4. For purposes set forth in detail below, the cooperation between threaded member 18 and receptacle 30 is such that, upon clockwise rotation of knob 20, receptacle 30 moves slowly to the left (as viewed in FIG. 4), while counter-clockwise rotation of knob 20 moves receptacle 30 to the right.

Protruding from the lower portion of body 20 and extending adjacent a portion of knob 20 is bracket 36, with spring loaded button 38 disposed therein. Button 38, being retained by set screw 40 operating in conjunction with compression spring 42, serves as an incremental adjustment mechanism releasably engaging radial grooves 44 as knob 20 is rotated in either direction (as best illustrated in FIG. 6). Button 38 also serves to impart a positive "clicking" feel to knob 20 and, by carefully selecting the spacing between grooves 44, the linear travel of receptacle 30 corresponding to a single click of knob 20 may be accurately pre-selected. Additionally, button 38 serves to prevent the inadvertent rotation of knob 20 and consequent movement of receptacle 30 which might otherwise result from the vibrations experienced by printing press 5 during normal operation.

The final component making up register cam 10 is mounting arm 46 which provides the means for attaching register cam 10 to the platen assembly 47. Preferably, screw 48 is inserted through hole 50 and is screwed into a threaded receiving hole (not shown) formed on the underside of platen assembly 47. Screw 48 is preferably a shoulder screw, thus allowing register cam 10 to pivot freely about axis 52 without loosening or tightening screw 48.

Figure 2A:
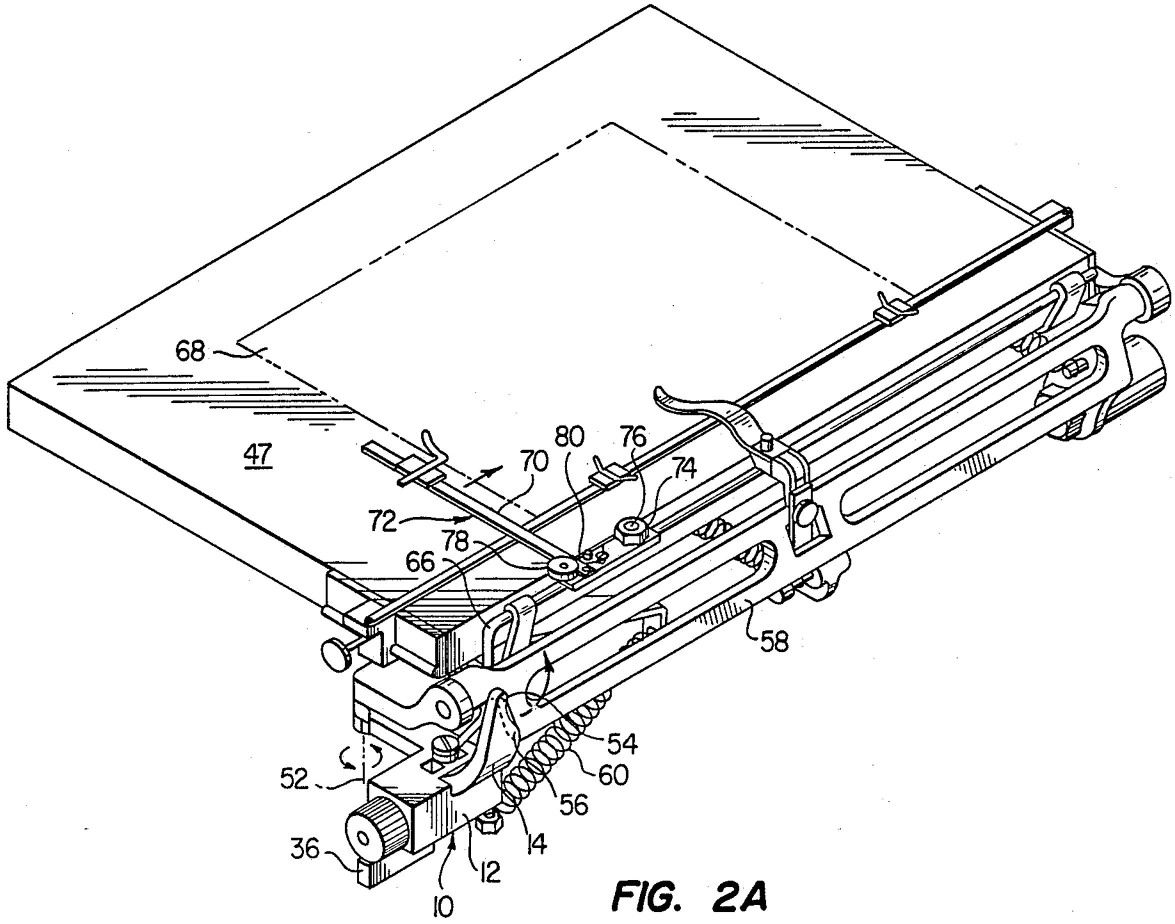
FIG. 2A is a perspective view of a platen assembly having the preferred embodiment of the present invention installed thereon, showing the gripper bar in its lowered position.
Figure 2B:
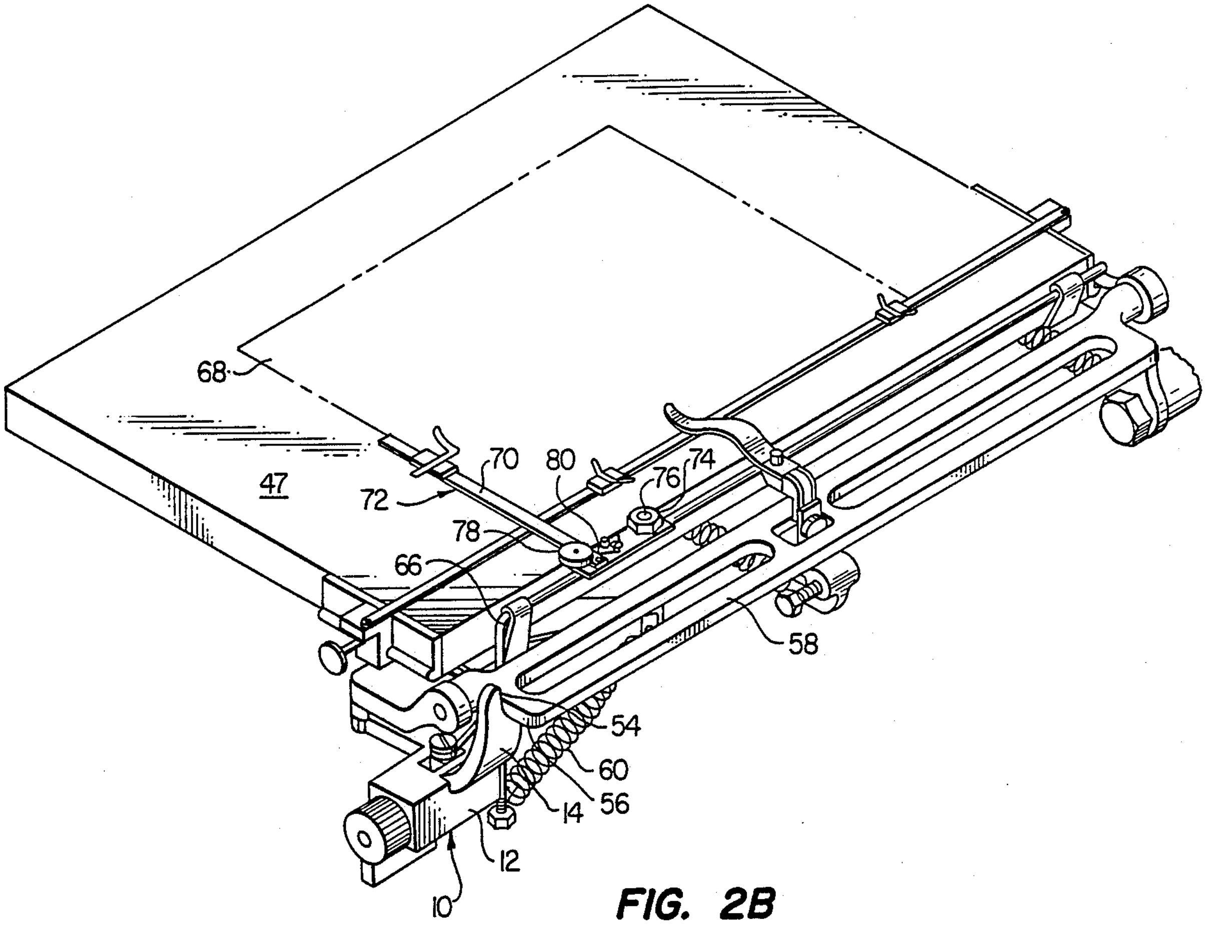
FIG. 2B is a perspective view of the platen assembly shown in FIG. 2A, with the gripper bar in its raised position.

During operation of printing press 5, register cam 10 serves as the necessary means of communication between the driving and driven elements of the document alignment mechanism. The principle driving element for these purposes is gripper bar 58, with connecting rod 62, register rod 66, and register gauge assembly 72 comprising the driven elements. As best illustrated in FIGS. 2A, 2B, and 3, face 54 of caming member 14 serves as a bearing surface which is maintained in substantially constant contact with edge portion 56 of gripper bar 58 by means of tension spring 60. As with conventional devices, register cam 10 pivots in and out as gripper bar 58 alternatingly rotates between raised (FIG. 2B) and lowered (FIG. 2A) positions. As register cam 10 pivots back and forth in response to the movement of gripper bar 58, connecting link 62, having one end secured to receptacle 30 by screw 64 and the other end engaging register rod 66, drives register rod 66 back and forth linearly. The desired alignment of printing medium 68 is thus accomplished by edge 70 of register gauge assembly 72, register gauge assembly 72 being fastened to register rod 66 by means of retaining nut 74 and eye bolt 76.

Unique adjustment features of the present invention become advantageous whenever fine transverse adjustment of register gauge assembly 72 is required. With purely conventional devices, gross adjustment of the register gauge assembly 72 is accomplished by loosening retaining nut 74, which engages eye bolt 76, and sliding assembly 72 along register rod 66 as needed. With conventional presses, fine adjustment of register gauge 70 is performed by turning adjustment nut 78 which has a conical lower surface (not shown) bearing against a portion of register gauge 70, whereby clockwise rotation of adjustment nut 78 causes register gauge 70 to pivot slightly to the right when viewed as in FIGS. 2A and 2B, and counterclockwise rotation of adjustment nut 78 allows register gauge 70 to pivot slightly to the left. Spring member 80 operates to maintain register gauge 70 in a leftward biased position, forcing register gauge 70 to pivot to the left upon loosening (counterclockwise rotation) of adjustment nut 78.

A common problem in the printing industry arises from the use of adjustment nut 78 for its intended purpose. It is widely known by those in the industry that adjustment nut 78 is particularly susceptible to inadvertent loosening caused by the vibrations resulting from the normal operation of the printing press. Since such loosening occurs gradually during operation of the press, the result is that register guide 70 slowly pivots to the left throughout the course of a long run. Consequently, those skilled in the art have learned that the printing press must be frequently stopped so that the position of register gauge 70 can be checked and corrected by suitable rotation of adjustment nut 78. In order to correct this common problem, press operators typically set register gauge 70 at a substantially perpendicular angle to register rod 66, then weld adjustment nut 78 in place. This modification solves the problems associated with inadvertent loosening of adjustment nut 78, but also severely reduces the ability of the operator to perform fine adjustment of register gauge 70; after such modification, fine adjustment, like gross adjustment, is accomplished by loosening retaining nut 74 and carefully sliding register gauge assembly 72 along register rod 66 as needed.

With the unique adjustment mechanism incorporated into register cam 10, fine adjustment of register gauge assembly 72 may be effected very simply and precisely by rotating knob 20 as required. Gross transverse adjustments are still accomplished by loosening retaining nut 74 and sliding assembly 72 as required, but register cam 10 provides a measure of fine tuning which was heretofore unknown in the art. Prior to this invention, the lateral placement of register gauge assembly 72 had not been selectively adjustable in precise increments. Furthermore, register cam 10 is virtually unaffected by vibration, thus making it possible to perform long runs without frequent adjustment of the alignment means.

Preferably, body 12, caming member 14, bracket 36, and mounting arm 46 of register cam 10 are all contiguous components of a single casing composed of a 70/30 mixture of nylon and glass fibers, with receptacle 30 being formed from steel. Additionally, it is contemplated that the useful life of register cam 10 and those components coming into contact therewith may be increased significantly by lining face 54 and hole 50 with bronze inserts to reduce the adverse effects of friction. It has been ascertained that threaded member 18 preferably comprises a screw or threaded rod portion of suitable length having $1\frac{1}{4}$–20 UNC threads.

While the principle of incorporating precise transverse alignment adjustment means into the register cam of a printing press has been made clear, it will be immediately apparent to those skilled in the art that there are many possible modifications to the disclosed arrangement without departing from the basic spirit of the present invention. Accordingly, the following claims are intended to cover and embrace not only the specific embodiments disclosed herein, but also such modifications within the spirit and scope of this invention.

What is claimed is:

1. An improved register cam for use on a printing press having alignment means for transversely aligning the printing medium, said register cam comprising:

a body;

a camming member extending outwardly from said body;

mounting means for operatively mounting said register cam on said printing press; and adjustment means for selectively moving at least a portion of said alignment means relative to said camming member, whereby the transverse position of said alignment means is adjustable in response to the operation of said adjustment means.

2. An improved register cam as set forth in claim 1, wherein said body includes a cavity formed therein, and said adjustment means comprise:

a receptacle slidably disposed within said cavity, having a receiving portion accessible through a suitable opening in said body, said receiving portion being adapted to engage fastening means, thereby securing a portion of said alignment means to said receptacle; and longitudinal driving means for selectively moving said receptacle back and forth along an axis generally parallel to the longitudinal axis of said body, whereby operation of said longitudinal driving means results in substantially linear movement of said receptacle and corresponding linear movement of said alignment means.

3. An improved register cam as set forth in claim 2, wherein:

said receptacle includes a threaded bore formed therethrough, said threaded bore being generally parallel to the longitudinal axis of said body, and said body further includes a longitudinal bore formed therethrough, said longitudinal bore being aligned with said threaded bore when said receptacle is in its normal operating position; said longitudinal driving means comprising:

a threaded rod disposed within said longitudinal cavity and engaging said threaded bore of said receptacle, the first end of said threaded rod being secured to prevent longitudinal movement thereof while allowing rotational movement, the second end of said threaded rod having grasping means secured thereto, whereby said threaded rod is hand rotatable by turning said grasping means; wherein rotation of said grasping means effects corresponding rotation of said threaded rod, thus producing said substantially linear movement of said receptacle.

4. An improved register cam as set forth in claim 3, wherein said grasping means comprise a knob.

5. An improved register cam as set forth in claim 4, wherein said knob is generally cylindrically shaped, having radial grooves formed around the outer perimeter thereof.

6. An improved register cam as set forth in claim 2, wherein said adjustment means further comprise an incremental engagement mechanism for urging the operation of said longitudinal driving means in preselected intervals; whereby said receptacle is moveable in pre-selected, substantially equal increments in response to the operation of said longitudinal driving means in said preselected intervals.

7. An improved register cam as set forth in claim 5, further comprising incremental engagement means for engaging said grooves, thereby urging the rotation of said knob in pre-selected intervals, each of said intervals corresponding to the distance between consecutive grooves.

8. An improved register cam for use on a printing press having alignment means for transversely aligning the printing medium, wherein said alignment means includes a driving portion and a driven portion, said register cam comprising:

a body, having transverse adjustment means incorporated therein;

a cam member extending outwardly from said body, said cam member having a bearing surface for operatively engaging said driving portion of said alignment means, said driving portion being alternatingly positionable between first and second positions; and mounting means, for pivotably mounting said register cam on said printing press, said register cam being pivotable between first and second positions corresponding to said first and second positions of said driving portion of said alignment means; wherein said adjustment means are operatively securable to said driven portion of said alignment means, such that the pivoting of said register cam between said first and second positions thereof operates to move said driven portion between corresponding first and second positions;

said adjustment means being operative to provide for selective transverse placement of said driven portion of said alignment means in said first and second positions thereof.

9. An improved printing press, comprising:

a platen;

alignment means for transversely aligning the printing medium on said platen prior to printing, said alignment means including a driving portion and a driven portion, said driven portion including an alignment member for engaging a portion of said printing medium and moving said printing medium to a pre-selected location on said platen; and a register cam having adjustment means incorporated therein, said register cam comprising:

mounting means for pivotably mounting said register cam near said platen;

a bearing surface for slidingly engaging a portion of said driving portion of said alignment means; and attachment means for operatively securing a portion of said driven portion of said alignment means; wherein said register cam provides for mechanical communication between said driving and driven portions of said alignment means, whereby alternating rotational movement of said driving portion is converted into alternating linear movement of said driven portion, said adjustment means being operative to provide for selective linear positioning of said alignment member.

10. An improved printing press, comprising:

a platen;

alignment means for transversely aligning the printing medium on said platen prior to printing, said alignment means including an alignment member for engaging a portion of said printing medium and moving said printing medium to a pre-selected position on said platen;

a register cam associated with said alignment means; and adjustment means, associated with said register cam, for selectively adjusting the transverse position of said alignment member relative to said platen.

* * * * *